(12) United States Patent
Sinha et al.

(10) Patent No.: US 12,330,090 B2
(45) Date of Patent: Jun. 17, 2025

(54) DEGASSING APPARATUS WITH A BUBBLE BREAKER

(71) Applicant: GENERAL ELECTRIC COMPANY, Schenectady, NY (US)

(72) Inventors: Shatil Sinha, Clifton Park, NY (US); James Duvall Bollacker, Niskayuna, NY (US); Ram Kumar Upadhyay, Niskayuna, NY (US)

(73) Assignee: General Electric Company, Evandale, OH (US)

( * ) Notice: Subject to any disclaimer, the term of this patent is extended or adjusted under 35 U.S.C. 154(b) by 451 days.

(21) Appl. No.: 17/958,991

(22) Filed: Oct. 3, 2022

(65) Prior Publication Data

US 2024/0109004 A1    Apr. 4, 2024

(51) Int. Cl.
*B01D 19/02* (2006.01)
*B01D 19/00* (2006.01)
*B29B 13/00* (2006.01)

(52) U.S. Cl.
CPC ......... *B01D 19/02* (2013.01); *B01D 19/0073* (2013.01); *B01D 19/0094* (2013.01); *B29B 13/00* (2013.01); *B29B 2013/005* (2013.01)

(58) Field of Classification Search
None
See application file for complete search history.

(56) References Cited

U.S. PATENT DOCUMENTS

| 3,377,778 | A | 4/1968 | Gaertner |
| 4,787,921 | A | 11/1988 | Shibata et al. |
| 8,182,586 | B2 | 5/2012 | Mahaffy |
| 8,858,682 | B2 | 10/2014 | Akechi |
| 9,656,473 | B2 | 5/2017 | Ikeda et al. |

FOREIGN PATENT DOCUMENTS

| CN | 106075946 A | | 11/2016 | |
| CN | 108465271 A | * | 8/2018 | ......... B01D 19/0031 |
| CN | 109126210 A | | 1/2019 | |
| JP | 2009195833 A | | 9/2009 | |
| KR | 101741368 B1 | * | 6/2017 | ......... B01D 19/0068 |

OTHER PUBLICATIONS

CN108465271A_ENG (Espacenet machine translation of Lu) (Year: 2018).*
KR101741368B1_ENG (Espacenet machine translation of Lee) (Year: 2017).*
R. Kok, J.E.Zajic, A Mechanical Foam Breaker, Biotechnology and Bioengineering Jul. 16, 1974, pp. 273-275, vol. XVII, John Wiley & Sons, Inc., London, Ontario, Canada.

* cited by examiner

*Primary Examiner* — Gabriel E Gitman
(74) *Attorney, Agent, or Firm* — McGarry Bair PC (57) ABSTRACT

An apparatus and method for a degassing apparatus with a degassing chamber and a container. The container is located within the degassing chamber and defines a holding chamber with an opening. An insert for being received in the opening. The insert including at least one conduit extending between an inlet and an outlet.

20 Claims, 6 Drawing Sheets

ДEGASSING APPARATUS WITH A BUBBLE BREAKER

TECHNICAL FIELD

This disclosure generally relates to a degassing apparatus and more specifically to an insert for a degassing apparatus.

BACKGROUND

Degassing is a process for removing trapped air from within mixed materials such as room-temperature-vulcanizing (RTV) silicone rubbers, polyurethane casting resins, infusion epoxies, and other materials where air can become entrapped when the two parts of the material are mixed together. To produce quality resin castings and defect free silicone molds, air that is trapped in the resin or silicone must be removed. Bubbles that are trapped in the material can affect the strength of the casting. A bubble on the surface of a silicone mold can reproduce on the casting as a cavity or as a raised defect which is difficult and time consuming to repair. Exposing the resin or silicone to a vacuum degassing chamber enables the trapped gases to expand and release from the resin.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure generally relate to a degassing apparatus, and more particularly to a bubble breaker for the degassing apparatus. For purposes of illustration, the present disclosure will be described with respect to a resin degassing apparatus including a degassing chamber and a container for holding resin. It will be understood, however, that aspects of the disclosure described herein are not so limited and may have general applicability within other degassing equipment in need of breaking bubbles as they rise. Aspects of the disclosure provide for a bubble breaker in combination with a container for a resin degasser, providing for improved degassing performance and preventing resin overflow.

Degassing of resin is common prior to infusion during a liquid resin infusion process like resin transfer molding (RTM) or vacuum-assisted resin transfer molding (VARTM). The degassing process can be conducted in industrial degassing equipment including a container placed inside a degassing chamber with a capability to heat and agitate the resin. Once a certain viscosity is reached any trapped gasses come out of the resin, nucleate and become bubbles under vacuum pressure. Initially, the bubbles come out voraciously which can cause an overflow of the container within the chamber. When this occurs, typically either the vacuum is reduced/interrupted to control the bubbles manually or an auto venting system is initiated. This degassing method poses a risk of resin overflow within the equipment due to oversight from the operator or when the sensitivity of sensors initiating the auto vent is not reliable. In order to eliminate this risk, a bubble breaker described herein can be inserted into the chamber for breaking the bubbles at the surface and eliminating the need for venting. In turn, overflow of resin material is eliminated and the time the degassing process takes is reduced.

The word "exemplary" may be used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first," "second," and "third" can be used interchangeably to distinguish one component from another and are not intended to signify location or importance of the individual components.

The terms "upstream" and "downstream" may be used herein in reference to the relative direction with respect to a flow in a pathway. For example, with respect to a fluid flow, "upstream" refers to the direction from which the fluid flows, and "downstream" refers to the direction to which the fluid flows.

The term "fluid" can be a gas or a liquid. The term "fluid communication" means that a fluid is capable of making the connection between the areas specified.

The singular forms "a", "an", and "the" include plural references unless the context clearly dictates otherwise.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
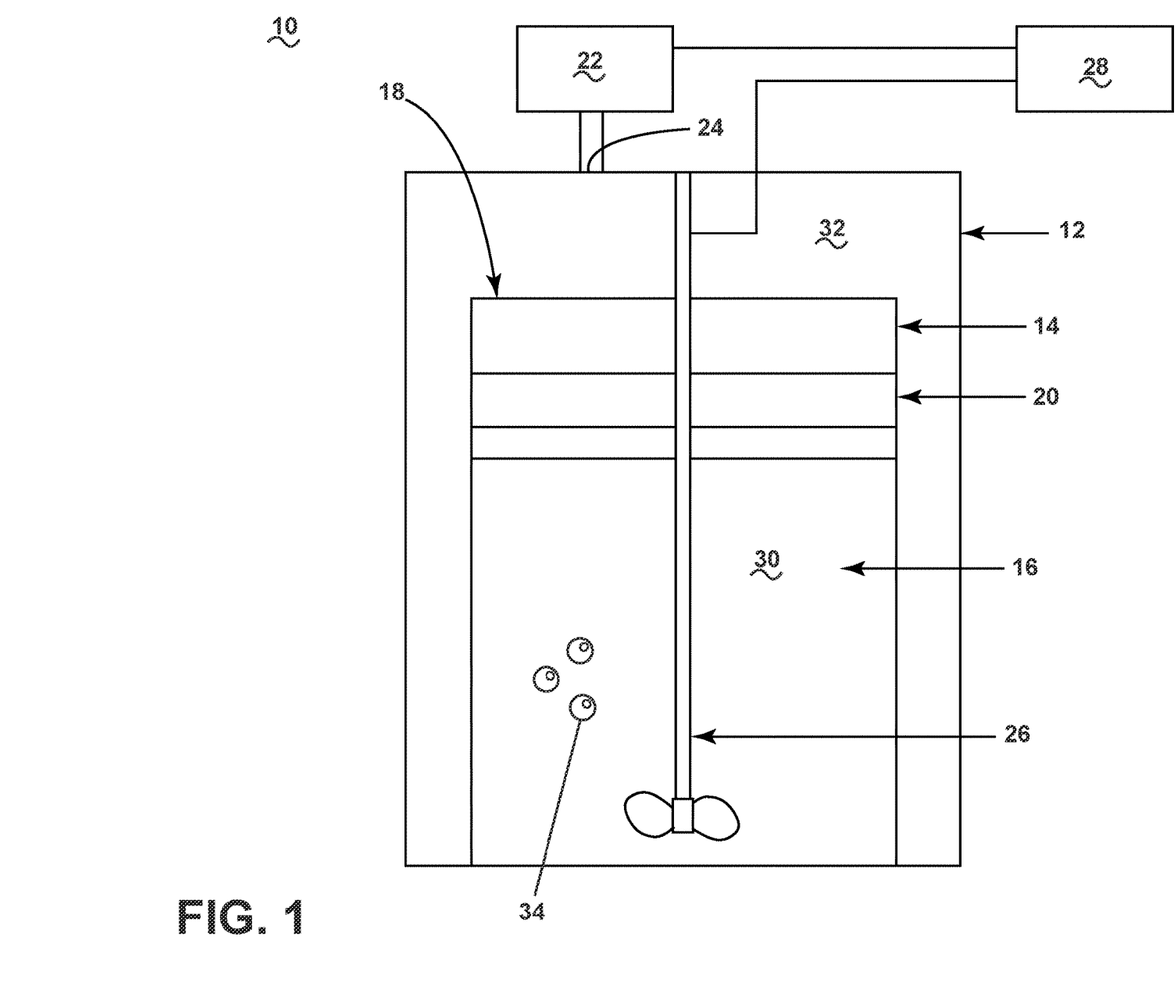
FIG. 1 is a schematic of a degassing apparatus with a bubble breaker.

FIG. 1 is a schematic of a degassing apparatus 10. The degassing apparatus 10 can include a degassing chamber 12 and a container 14 received therein. The container 14 can define a holding chamber 16 with an opening 18. The holding chamber 16 can hold a predetermined amount of liquid, by way of non-limiting example resin 30, or any liquid in which dissolved gases need to be removed. A bubble breaker 20 can be located at the opening 18 above the holding chamber 16. The bubble breaker 20 can be snug fit into the opening 18 of the container 14. It is further contemplated that the bubble breaker 20 is affixed to the container 14 as a lid. Additionally, the bubble breaker 20 and the container 14 can be formed as a single unit. The degassing chamber 12 can be fluidly coupled to a vacuum 22 at a port 24 on the degassing chamber 12. An agitator 26 can extend through the opening 18 and through the bubble breaker 20 into the holding chamber 16. The agitator 26 and vacuum 22 can be in communication with a user interface 28.

During operation the vacuum 22 can be turned on via the user interface 28 to create a vacuum void 32 in the degassing chamber 12. The vacuum void 32 will cause any gas bubbles 34 trapped in the resin 30 to nucleate where tiny bubbles coalesce into larger ones and rise in the resin 30 toward the bubble breaker 20. The agitator 26 can be turned on to further agitate the resin 30 and release the gas bubbles 34, referred to herein simply as the bubble 34.

Figure 2:
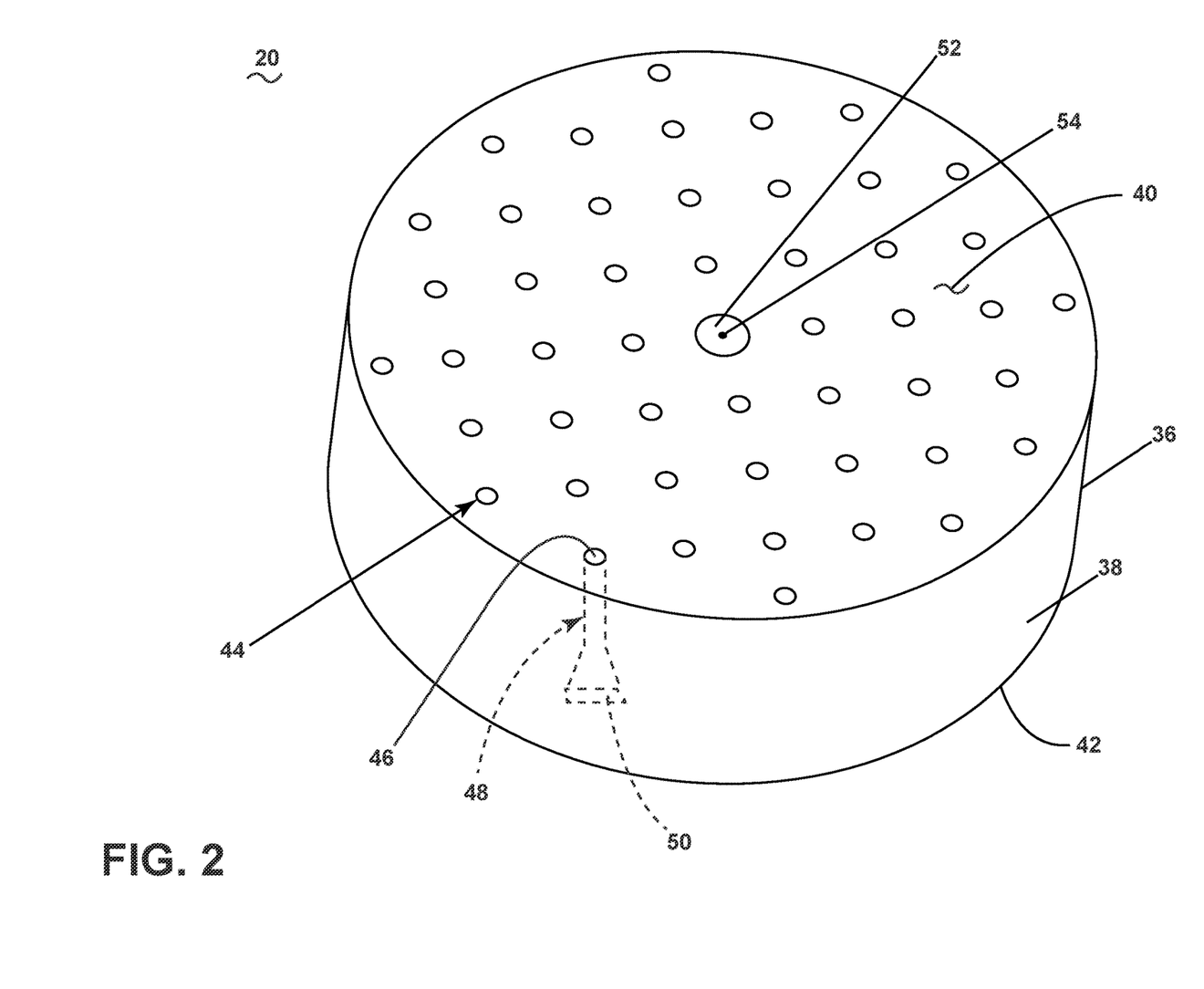
FIG. 2 is a perspective top view of the bubble breaker in FIG. 1 according to an aspect of the disclosure herein.

FIG. 2 is a perspective view of the bubble breaker 20. The bubble breaker 20 can have a cylindrical shape 36, though any shape is contemplated. The bubble breaker 20 can be defined by a body 38 extending between a top surface 40 and a bottom surface 42. A set of outlets 44 are located on the top surface 40. The set of outlets 44 include individual outlets 46 each fluidly connected to a conduit 48 extending through the body 38. The conduit 48 is fluidly connected to an inlet 50 on the bottom surface 42. A thru hole 52 can be disposed in a center 54 of the body 38 through which the agitator 26 (FIG. 1) can be received.

Figure 3:
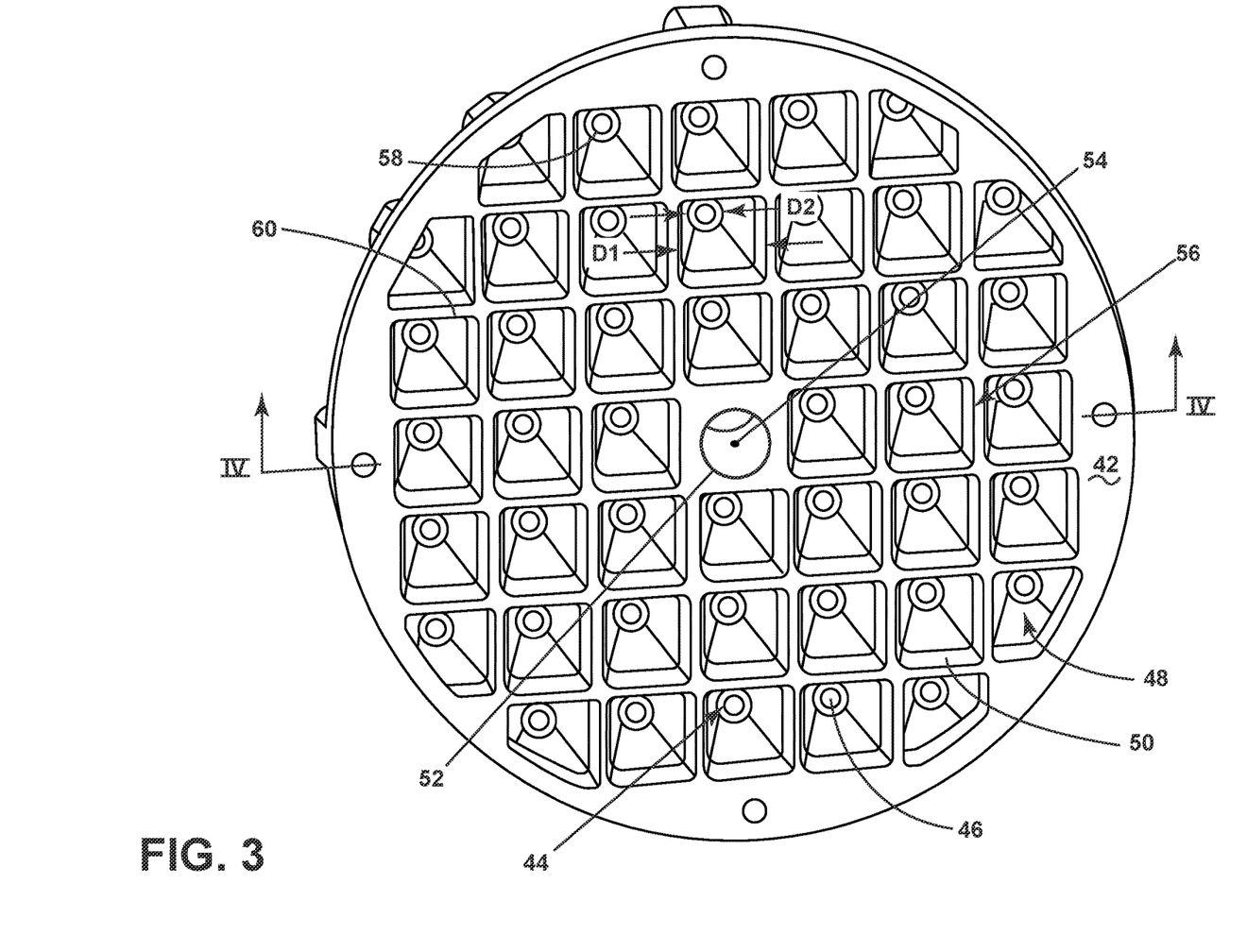
FIG. 3 is a bottom view of the bubble breaker from FIG. 2.

FIG. 3 is a bottom view of the bubble breaker 20. A set of inlets 56 including the inlet 50 is located on the bottom surface 42. Each inlet 50 defines a first hydraulic diameter (denoted "D1"). Each outlet 46 defines a second hydraulic diameter (denoted "D2") less than the first hydraulic diameter D1. The outlet 46 can have a circular shape 58 while the inlet 50 can have a quadrilateral shape 60, by way of non-limiting example a square shape as illustrated. Any shapes for the outlet 46 and the inlet 50 are contemplated as long as D2<D1 and the conduit 48 defines a decreasing cross-sectional area (denoted "CA").

Figure 4:
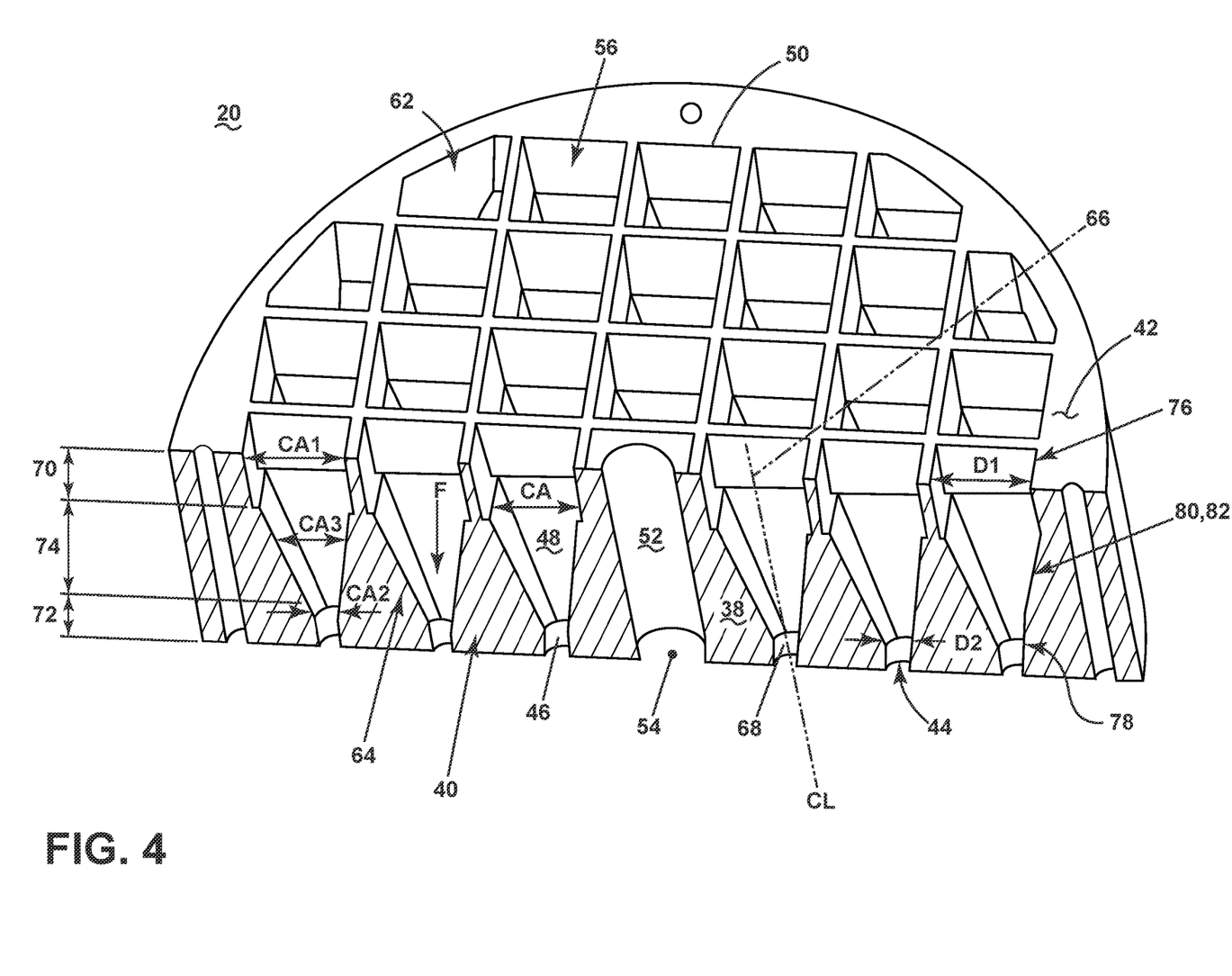
FIG. 4 is a cross-sectional perspective view of the bubble breaker taken along line IV-IV in FIG. 3 illustrating conduits in the bubble breaker.

Turning to FIG. 4, a cross-sectional isometric view of the bubble breaker 20 taken along line IV-IV of FIG. 3 is illustrated. The conduit 48 can be part of multiple conduits 62 fluidly connecting the set of inlets 56 to the set of outlets 44. The multiple conduits 62 can define a cellular structure 64 of the bubble breaker 20.

Each conduit 48 can define a conduit centerline (denoted "CL") extending perpendicularly to the cross-sectional area CA between a geometric center 66 of the inlet 50 and a geometric center 68 of the outlet 46. In other words, the outlet 46 can be centered above the inlet 50. Each conduit 48 can be defined by three sections, an inlet section 70 fluidly coupled to the inlet 50, an outlet section 72 fluidly coupled to the outlet 46, and a middle section 74 fluidly coupling the inlet section 70 to the outlet section 72. The decreasing cross-sectional area CA can be segmented into the three sections with respect to a bubble flow (denoted "F") extending from the inlet 50 to the outlet 46. The inlet section 70 can have a first substantially constant cross-sectional area (denoted "CA1") defining a cuboid shape 76. The outlet section 72 can also have a second substantially constant cross-sectional area (denoted "CA2") less than the first substantially constant cross-sectional area CA2 defining a cylindrical shape 78. The middle section 74 can have a decreasing cross-sectional area (denoted "CA3") with respect to the bubble flow F. The middle section 74 can have a pyramid shape 80, and more specifically a truncated pyramid shape 82. While illustrated as segmented, it should be understood that the decreasing cross-sectional area CA can be continuously decreasing between the inlet 50 and the outlet 46.

Figure 5:
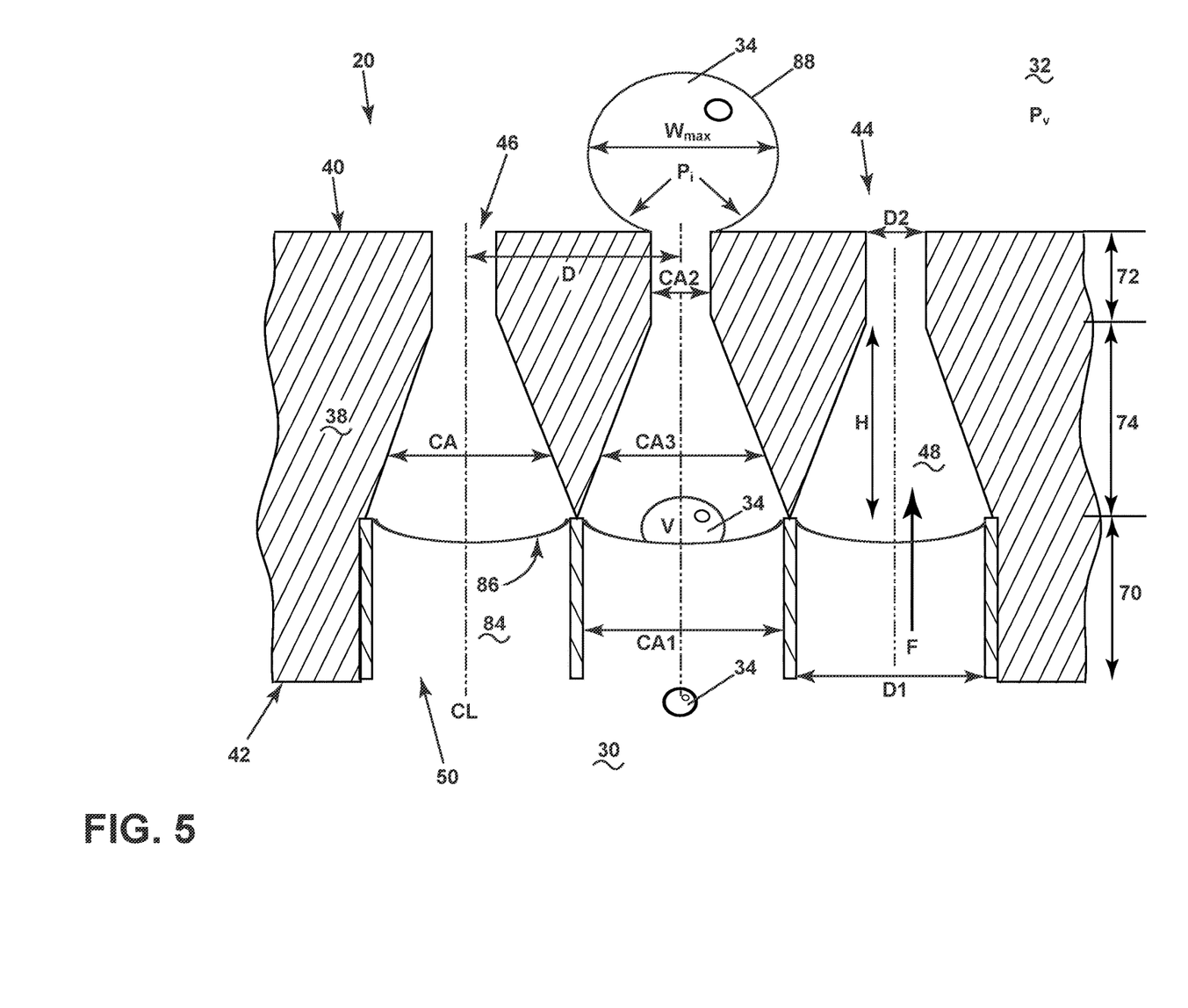
FIG. 5 is a schematic cross-sectional view of three conduits of the bubble breaker from FIG. 4.

Turning to FIG. 5, a schematic cross-sectional view of three of the conduits 48 of the bubble breaker 20 is illustrated with the bubble flow F pointing upwards with respect to the page as would occur during operation. A single bubble 34 is isolated at the inlet 50 and rises up through a column of resin 84 defined by the inlet section 70 due to the pressure gradient within the resin and buoyancy created by the gas trapped in the bubble 34. A resin meniscus 86 is formed at or before a beginning of the middle section 74. A height (denoted "H") of the middle section 74 is determined based on a surface tension of the resin 30. As the bubble 34 ascends, a volume (denoted "V") of the bubble 34 increases due to the pressure gradient which is decreasing as the bubble rises. Passing the bubble 34 through the middle section 74 causes the volume V to increase quickly. The bubble 34 becomes cylindrical in shape with resin walls 88 in the outlet section 72 where a differential between internal pressure (denoted "$P_i$") and vacuum pressure (denoted "$P_v$") continues to cause the bubble to move toward the outlet 46. Upon exiting the outlet 46, the bubble 34 will expand while the resin walls 88 will cause the bubble to remain affixed to the outlet 46. As the bubble grows, gravity pulls down and eventually overcomes the surface tension. An increase in volume V will decrease the internal pressure Pi until the internal pressure Pi equalizes with the vacuum pressure Pv. This equalization along with gravity causes the bubble 34 to burst. The bubbles 34 burst due to the vacuum void 32 and internal pressure Pi limited by surface tension from the resin walls 88.

Adjacent outlets 46 in the set of outlets 44 are spaced a predetermined distance (denoted "D") measured from centerline CL to centerline CL, apart to prevent adjacent bubbles 34 from attaching to each other and forming bigger bubbles. A maximum bubble width $W_{max}$ determines the predetermined distance D between the outlets 46. The size of the second hydraulic diameter D2 of the outlet 46 controls the bubble size. The predetermined distance D between adjacent geometric centers 68 (FIG. 4) of the outlets 46 is greater than the maximum bubble width $W_{max}$. By causing the bubbles 34 to burst, resin overflow inside the degassing chamber 12 (FIG. 1) is greatly reduced and even eliminated, which in turn reduces the degassing cycle time.

Figure 6:
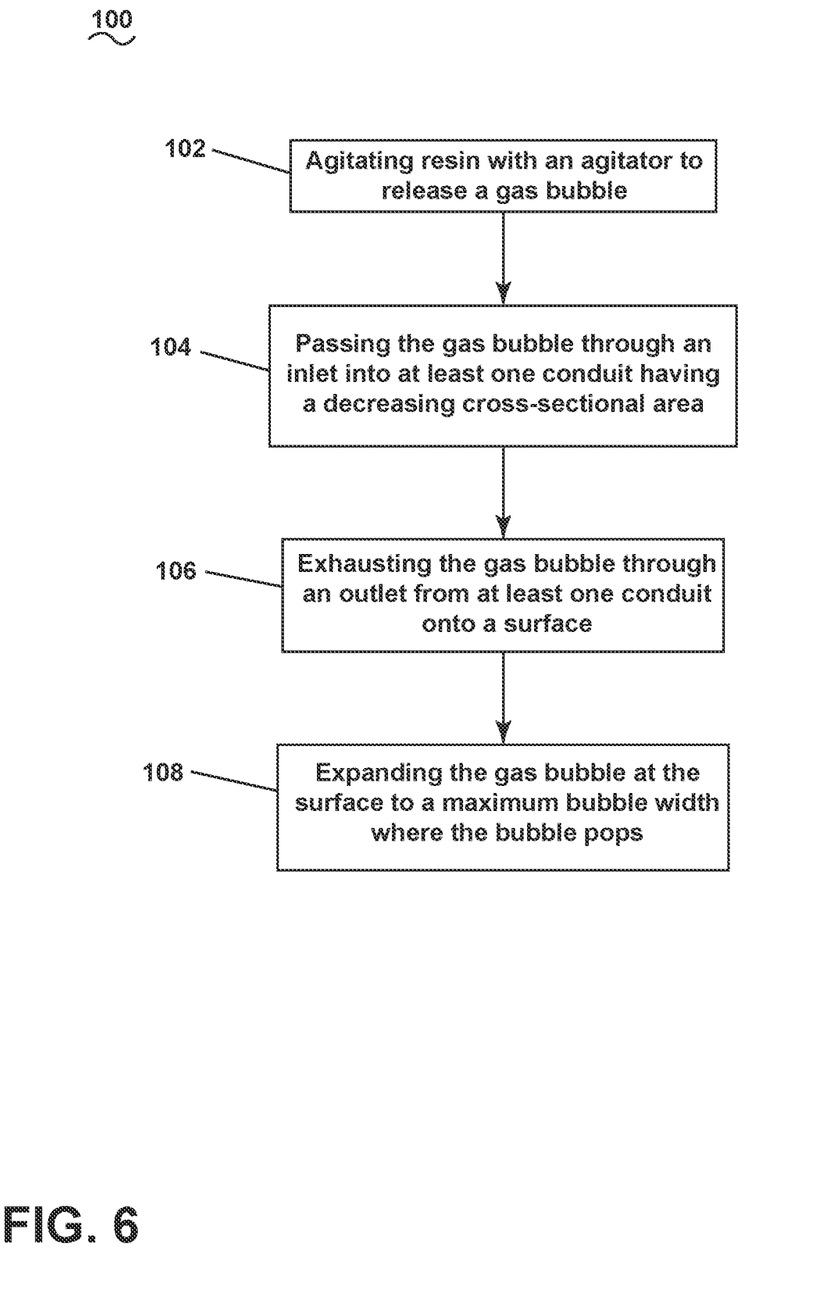
FIG. 6 is a flow chart of a method for dispersing gas bubbles in resin with the bubble breaker according to an aspect of the disclosure herein.

FIG. 6 is a flow chart illustrating a method 100 for dispersing gas bubbles 34 in the degassing apparatus 12. The method includes at 102 agitating the resin 30 with the agitator 26 to release at least one gas bubble 34 from the resin 30. At 104, the bubble 34 is passed through the inlet 50 into the conduit 48 through the overall decreasing cross-sectional area CA. At 106 the bubble 34 is exhausted through the outlet 46 onto the top surface 40. Finally, at 108 the bubble 34 is expanded to the maximum bubble width $W_{max}$ where the bubble 34 bursts. It should be understood that the method 100 can include passing multiple gas bubbles 34 through multiple conduits 48 and exhausting the multiple gas bubbles 34 through the multiple outlets 46 spaced from each other the predetermined distance D larger than the maximum bubble width $W_{max}$ ($D>W_{max}$).

As previously discussed, benefits associated with the disclosure discussed herein include decreasing a cycle time for degassing a resin. When a user is not required to check or manually vent the degassing chamber, the cycle time for degassing the resin is decreased. Further, the apparatus and method discussed herein prevents and/or eliminates resin overflow during a degassing cycle by bursting any bubbles that rise to the top. By bursting the bubbles, the bubble breaker prevents foaming which in turn prevents overflow. The apparatus and method discussed herein also controls for user and/or equipment errors by preventing the need for manual venting and/or auto-venting.

It should be understood that any combination of the geometry related to the bubble breaker discussed herein is contemplated. The varying aspects of the disclosure discussed herein are for illustrative purposes and not meant to be limiting. It should be appreciated that application of the disclosed design is can be for applicable resins, silicone rubbers, and slower-setting harder resins.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A degassing apparatus comprising a degassing chamber; a container, located within the degassing chamber, and defining a holding chamber with an opening; a bubble breaker located at the opening, the bubble breaker comprising: a bottom surface facing the holding chamber; a top surface spaced from the bottom surface; at least one conduit extending between and fluidly connecting an inlet defining a first hydraulic diameter at the bottom surface and an outlet defining a second hydraulic diameter less than the first hydraulic diameter at the top surface.

The degassing apparatus of any preceding clause wherein the at least one conduit has a decreasing cross-sectional area from the inlet to the outlet.

The degassing apparatus of any preceding clause wherein the outlet is centered above the inlet such that a conduit centerline extending perpendicular to the decreasing cross-sectional area passes through a geometric center of the inlet and a geometric center of the outlet.

The degassing apparatus of any preceding clause wherein the at least one conduit is multiple conduits defining a cellular structure of the bubble breaker.

The degassing apparatus of any preceding clause wherein adjacent outlets in a set of outlets are spaced apart a predetermined distance greater than a maximum bubble width of a gas bubble released from liquid in the holding chamber.

The degassing apparatus of any preceding clause wherein the inlet is quadrilateral in shape.

The degassing apparatus of any preceding clause wherein the outlet is circular in shape.

The degassing apparatus of any preceding clause wherein the conduit comprises an inlet section fluidly coupled to the inlet, an outlet section fluidly coupled to the outlet, and a middle section fluidly coupling the inlet section to the outlet section, wherein the inlet section, the outlet section, and the middle section have different shapes.

The degassing apparatus of any preceding clause wherein the inlet section defines a cuboid shape, the middle section defines a pyramid shape, and the outlet section defines a cylindrical shape.

The degassing apparatus of any preceding clause wherein the pyramid shape is a truncated pyramid.

The degassing apparatus of any preceding clause further comprising an agitator passing through the bubble breaker into the holding chamber.

A degassing apparatus comprising a degassing chamber; a container, located within the degassing chamber, and defining a holding chamber with an opening; a bubble breaker fluidly coupled to the opening and having multiple spaced conduits, each conduit extending between an inlet facing the holding chamber and an outlet facing the opening.

The degassing apparatus of any preceding clause wherein each of the multiple spaced conduits has a decreasing cross-sectional area from the inlet to the outlet.

The degassing apparatus of any preceding clause wherein the outlet is centered above the inlet such that a conduit centerline extending perpendicular to the decreasing cross-sectional area passes through a geometric center of the inlet and a geometric center of the outlet.

The degassing apparatus of any preceding clause wherein the inlet is a quadrilateral shape.

The degassing apparatus of any preceding clause wherein the outlet is circular in shape.

The degassing apparatus of any preceding clause wherein each of the multiple spaced conduits comprise an inlet section fluidly coupled to the inlet, an outlet section fluidly coupled to the outlet, and a middle section fluidly coupling the inlet section to the outlet section, wherein the inlet section, the outlet section, and the middle section have different cross-sectional shapes.

The degassing apparatus of any preceding clause further comprising an agitator passing through the bubble breaker into the holding chamber.

A method for dispersing gas bubbles in a degassing apparatus, the method comprising agitating liquid with an agitator to release at least one gas bubble; passing the at least one gas bubble through an inlet in a bubble breaker into at least one conduit having a decreasing cross-sectional area; exhausting the at least one gas bubble through an outlet from the at least one conduit onto a surface of the bubble breaker; and expanding the at least one gas bubble at the surface to a maximum bubble width at which the at least one gas bubble bursts.

The method of any preceding clause further comprising passing multiple gas bubbles through multiple conduits and exhausting the multiple gas bubbles through multiple outlets spaced from each other a distance larger than the maximum bubble width.

The invention claimed is:

1. A degassing apparatus comprising:
 a degassing chamber;
 a container, located within the degassing chamber, and defining a holding chamber with an opening;
 a bubble breaker located at the opening, the bubble breaker comprising:
  a bottom surface facing the holding chamber;
  a top surface spaced from the bottom surface;
  at least one conduit extending between and fluidly connecting an inlet defining a first hydraulic diameter at the bottom surface and an outlet defining a second hydraulic diameter less than the first hydraulic diameter at the top surface.

2. The degassing apparatus of claim 1 wherein the at least one conduit has a decreasing cross-sectional area from the inlet to the outlet.

3. The degassing apparatus of claim 2 wherein the outlet is centered above the inlet such that a conduit centerline extending perpendicular to the decreasing cross-sectional area passes through a geometric center of the inlet and a geometric center of the outlet.

4. The degassing apparatus of claim 1 wherein the at least one conduit is multiple conduits defining a cellular structure of the bubble breaker.

5. The degassing apparatus of claim 4 wherein adjacent outlets in a set of outlets are spaced apart a predetermined distance greater than a maximum bubble width of a gas bubble released from liquid in the holding chamber.

6. The degassing apparatus of claim 1 wherein the inlet is quadrilateral in shape.

7. The degassing apparatus of claim 1 wherein the outlet is circular in shape.

8. The degassing apparatus of claim 1 wherein the at least one conduit comprises an inlet section fluidly coupled to the inlet, an outlet section fluidly coupled to the outlet, and a middle section fluidly coupling the inlet section to the outlet section, wherein the inlet section, the outlet section, and the middle section have different shapes.

9. The degassing apparatus of claim 8 wherein the inlet section defines a cuboid shape, the middle section defines a pyramid shape, and the outlet section defines a cylindrical shape.

10. The degassing apparatus of claim 9 wherein the pyramid shape is a truncated pyramid.

11. The degassing apparatus of claim 1 further comprising an agitator passing through the bubble breaker into the holding chamber.

12. A degassing apparatus comprising:
a degassing chamber;
a container, located within the degassing chamber, and defining a holding chamber with an opening;
a bubble breaker fluidly coupled to the opening and having multiple spaced conduits, each conduit extending between an inlet facing the holding chamber and an outlet facing the opening.

13. The degassing apparatus of claim 12 wherein each of the multiple spaced conduits has a decreasing cross-sectional area from the inlet to the outlet.

14. The degassing apparatus of claim 13 wherein the outlet is centered above the inlet such that a conduit centerline extending perpendicular to the decreasing cross-sectional area passes through a geometric center of the inlet and a geometric center of the outlet.

15. The degassing apparatus of claim 12 wherein the inlet is a quadrilateral shape.

16. The degassing apparatus of claim 12 wherein the outlet is circular in shape.

17. The degassing apparatus of claim 12 wherein each of the multiple spaced conduits comprise an inlet section fluidly coupled to the inlet, an outlet section fluidly coupled to the outlet, and a middle section fluidly coupling the inlet section to the outlet section, wherein the inlet section, the outlet section, and the middle section have different cross-sectional shapes.

18. The degassing apparatus of claim 12 further comprising an agitator passing through the bubble breaker into the holding chamber.

19. A method for dispersing gas bubbles in a degassing apparatus, the method comprising:
agitating liquid with an agitator to release at least one gas bubble;
passing the at least one gas bubble through an inlet in a bubble breaker into at least one conduit having a decreasing cross-sectional area;
exhausting the at least one gas bubble through an outlet from the at least one conduit onto a surface of the bubble breaker; and
expanding the at least one gas bubble at the surface to a maximum bubble width at which the at least one gas bubble bursts.

20. The method of claim 19 further comprising passing multiple gas bubbles through multiple conduits and exhausting the multiple gas bubbles through multiple outlets spaced from each other a distance larger than the maximum bubble width.

* * * * *